T. F. MORSE.
COFFEE STONING APPARATUS.
APPLICATION FILED JAN. 14, 1916.

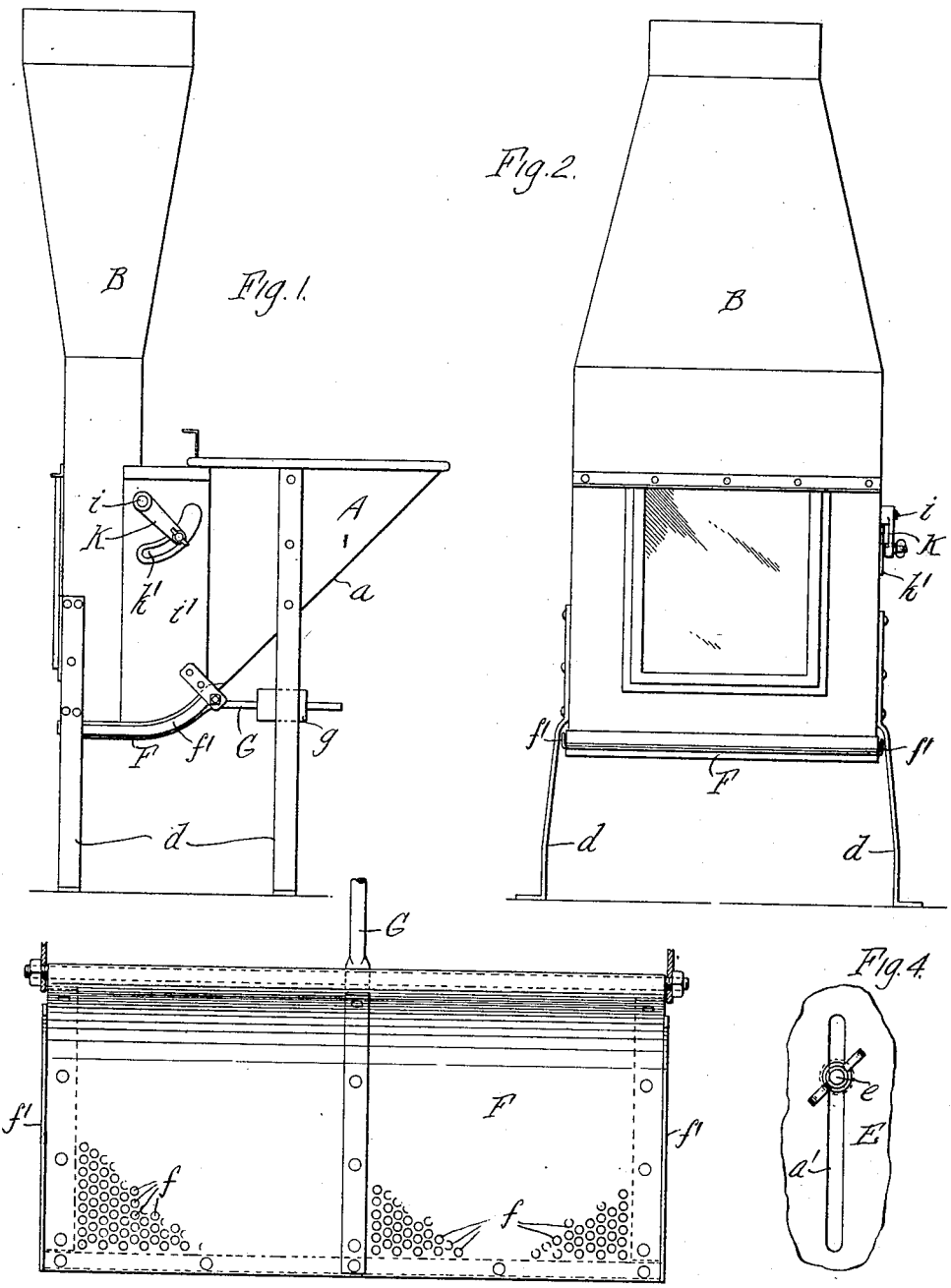

1,323,306.

Patented Dec. 2, 1919.
2 SHEETS—SHEET 2.

Inventor:
Theodore F. Morse.
By Wilhelm Parker.
Attorneys.

UNITED STATES PATENT OFFICE.

THEODORE F. MORSE, OF SILVER CREEK, NEW YORK, ASSIGNOR TO HUNTLEY MANUFACTURING CO., OF SILVER CREEK, NEW YORK.

COFFEE-STONING APPARATUS.

1,323,306.       Specification of Letters Patent.       Patented Dec. 2, 1919.

Application filed January 14, 1916. Serial No. 72,002.

*To all whom it may concern:*

Be it known that I, THEODORE F. MORSE, a citizen of the United States, residing at Silver Creek, in the county of Chatauqua and State of New York, have invented a new and useful Improvement in Coffee-Stoning Apparatus, of which the following is a specification.

This invention relates to coffee stoning legs or apparatus which are used for separating stones or particles of other heavy foreign matter from coffee beans. In preparing coffee it is a common practice to discharge the coffee from the roaster into an apparatus known as a "stoning leg" through which a current of air is drawn by a fan or suction device for the purpose of separating the coffee beans from the stones or other heavier particles of foreign matter which may be mixed with the coffee beans. In these stoning legs as ordinarily constructed, the separating air current is drawn into the separating chamber through the hopper through which the coffee passes from the roasting machine into the stoning leg. These devices as heretofore constructed do not produce a complete and thorough separation of all of the stones or foreign material from the coffee because they do not provide for a sufficiently intimate and uniform distribution of the air through the material, nor a sufficiently accurate regulation of the suction to insure a thorough separation when the difference in weight between the coffee beans and particles of foreign matter is slight.

The object of this invention is to provide a coffee stoning leg of an improved construction in which the air is uniformly and intimately distributed through the material in such a way as to insure a more perfect separation of the stones or other heavy foreign particles from the coffee, and which is provided with suction regulating means which can be readily adjusted to regulate the suction to the nicety required by reason of the variations in the relative weights of the coffee beans and the foreign particles contained therein.

In the accompanying drawings:

Figure 1 is a side elevation of a coffee stoning apparatus embodying the invention.

Fig. 2 is a front elevation thereof.

Fig. 3 is a plan view, partly in section, on an enlarged scale showing the perforated bottom of the separating chamber.

Fig. 4 is a detail view of the device for securing the hopper discharge gate in adjusted positions.

A represents a hopper into which the coffee is delivered from the coffee roaster and B is an upright suction leg or trunk which is connected at its upper end to a fan or air suction device of any suitable construction (not shown), for producing an ascending current of air through the leg or trunk for carrying up the coffee and thus separating it from the heavier particles mixed therewith. The hopper A has an inclined bottom $a$ and an opposite upright wall $a'$, the lower end of which is separated from the bottom $a$ to provide a discharge opening C which extends horizontally from side to side of the hopper and through which the coffee is adapted to discharge from the hopper into a separating chamber D with which the open lower end of the suction leg B communicates above the bottom of the chamber.

$d$ represents supporting legs of any suitable sort for the apparatus.

E represents a gate or plate which is adjustably mounted and is adapted to be secured with its lower edge nearer to or farther from the bottom $a$ of the hopper for regulating, as desired, the height of the discharge opening C of the hopper. As shown this gate or plate is arranged to move vertically against the inner side of the upright wall $a'$ of the hopper and a screw $e$ passing through a vertical slot in the gate and having a thumb nut is provided for securing the gate in the position to which it may be adjusted. The gate extends across the hopper from one side wall to the other thereof, and leaves between its lower edge and the bottom $a$ of the hopper a long narrow horizontal slit or opening through which the coffee discharges. The gate can be adjusted to cause the coffee to flow from the hopper in a wide shallow stream or layer the depth of which is determined by the adjustment of the gate.

F represents a plate, preferably curved, which is suitably hinged at one edge to the lower end of the hopper below the discharge opening C, forming a continuation of the hopper bottom and a bottom or closure for the lower end of the separating chamber D into which the coffee discharges from the hopper. This plate is provided with numerous perforations $f$ extending practically throughout the area of the plate, through which air is drawn into the suction leg. Nearly the entire volume of air for the suction leg is drawn in through these perforations. The perforated plate F is preferably provided at its opposite side edges with upright flanges $f'$, conveniently formed by angle bars secured to the edges of the plate, which overlap the lower ends of the side walls of the chamber D and prevent the coffee from escaping at the sides of the chamber, and also prevent any considerable volume of air from entering the chamber D through the spaces between the side walls of the same and the perforated plate when the latter is tilted slightly from its normal position against the bottom edges of the walls of the chamber D.

Figure 6:
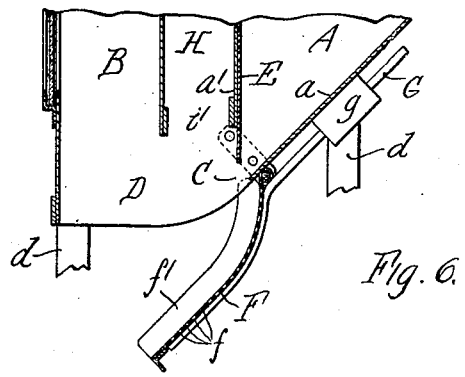
Fig. 6 is a similar fragmentary sectional elevation showing the perforated bottom tilted to discharge the foreign particles therefrom.
Figure 5:
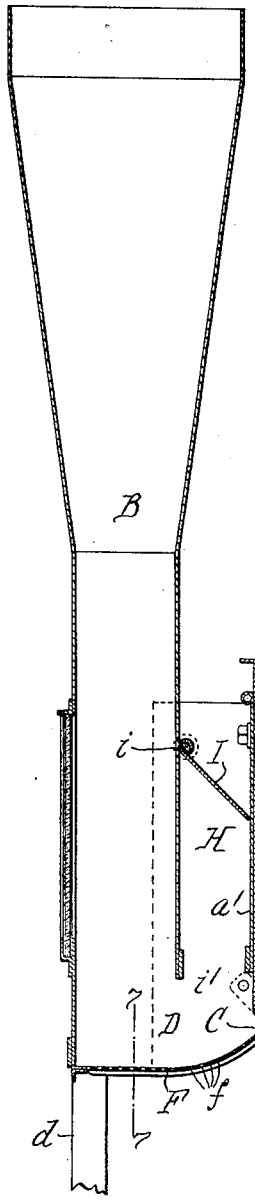
Fig. 5 is a sectional elevation, on an enlarged scale of the apparatus.
Figure 7:
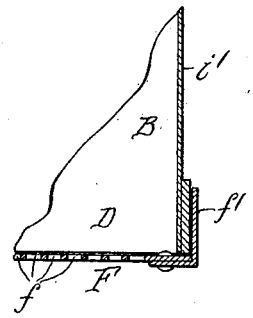
Fig. 7 is a fragmentary transverse sectional elevation on an enlarged scale in line 7—7, Fig. 5.

G represents an arm projecting from the hinged end of the perforated plate F and provided with an adjustable weight $g$ for counterbalancing the weight of the plate and normally holding the plate in its upper position against the lower edges of the walls of the separating chamber D. This weight can be adjusted so that when a predetermined weight of material accumulates on the perforated plate, it will tilt or swing the plate downwardly as indicated in Fig. 6, against the lifting action of the weight $g$, to permit the material which has accumulated on the plate to slide off of or discharge from the plate.

In the operation of the apparatus, the coffee flows from the hopper through the discharge opening C over the perforated plate F in a shallow stream or layer the depth of which is determined by the adjustment of the discharge gate E. The suction in the suction leg B draws air into the separating chamber through the numerous perforations in the bottom plate F, and this air passing upwardly through the coffee tends to lift the material and the coffee beans are carried with the air current upwardly through the suction leg, any stones or particles which may be contained in the coffee and are too heavy to be carried up by the air remaining on the perforated bottom plate F. As the separation continues, the stones or heavy foreign particles accumulate on the perforated bottom plate F and the air which is drawn inwardly through the perforations in the plate and is thus broken up into numerous small currents distributed throughout the mass of material tends to lift the mixed coffee beans and stones or foreign particles, thus agitating the material more or less and insuring a thorough separation of the coffee beans from the heavier particles. As the perforations are distributed practically throughout the extent of the bottom plate F, the suction is substantially uniform throughout the mass of material and the separation of the coffee beans from the heavy foreign material is very uniform and thorough.

In order to regulate the intensity of the suction through the perforated bottom plate and in the suction leg D, so as to insure just sufficient suction to carry off the coffee beans without carrying the heavier particles along with the coffee, the rear wall of the suction leg B is preferably separated from the upright wall $a'$ of the hopper by a passage H which is open at its upper end and opens at its lower end into the separating chamber above the bottom thereof and is provided with a valve or damper I which controls the admission of air through this passage to the separating chamber. By appropriately adjusting this valve, the suction through the perforated bottom plate F and the material discharging from the hopper can be broken or diminished more or less as may be required to give the requisite suction. The valve I shown is hinged at one side of the passage by a shaft $i$ which extends through bearing holes in the walls $i'$ which form the side walls of the separating chamber D. This shaft is provided at one end outside of the separating chamber with an arm K by which it can be turned to adjust the valve. The arm is provided at its outer end with a bolt or other securing device coöperating with a slotted segment $k'$ for securing the valve in the position to which it is adjusted. The valve can be set so as to close the passage H or so as to provide an air inlet opening of any required size in the passage and in this way the separating action of the air on the material can be nicely regulated with respect to the difference in weight between the coffee and the foreign particles therein.

I claim as my invention:

1. In a coffee stoning apparatus, the combination of a separating chamber, a suction leg communicating with said separating chamber and through which a current of air is caused to ascend, a plate at the bottom of said separating chamber having numerous perforations therein through which the air passes to said suction leg, a hopper having a narrow discharge opening through which the material flows in a shallow stream into the separating chamber over said perforated plate, and means which normally hold said perforated plate in operative position and permit the same to be moved by the weight of the material accumulating thereon to discharge such accumulating material.

2. In a coffee stoning apparatus, the combination of a separating chamber, a suction leg having an open lower end in said chamber and through which a current of air is caused to ascend, a plate located below the lower end of said suction leg and forming the bottom of said separating chamber, said plate having numerous perforations therein through which the air passes to said suction leg, a hopper having a horizontal elongated narrow discharge opening through which the material flows in a shallow stream into said separating chamber over said perforated plate, and counterbalancing means which normally hold said perforated plate in position to close the bottom of said separating chamber and permit the same to be moved by the weight of material accumulating thereon to discharge such accumulating material.

3. In a coffee stoning apparatus, the combination of a separating chamber, a suction leg communicating with said separating chamber and through which a current of air is caused to ascend, a bottom plate for said separating chamber hinged to swing downwardly, said plate having numerous perforations therein through which the air passes to said suction leg, a hopper having a discharge opening through which the material flows into the separating chamber over said bottom plate, and a counterbalancing weight which normally holds said bottom plate in position to close the bottom of the separating chamber and permits the bottom plate to swing downwardly to discharge material collecting thereon.

Witness my hand this 30th day of December, 1915.

THEODORE F. MORSE.

Witnesses:
T. H. COWDIN,
E. L. COON.